United States Patent
Takahashi (10) Patent No.: US 8,208,167 B2
(45) Date of Patent: Jun. 26, 2012

(54) INFORMATION PROCESSING APPARATUS, IMAGE FORMING APPARATUS, PRINT-DATA GENERATION METHOD, MAP-INFORMATION GENERATION METHOD, AND COMPUTER PROGRAM PRODUCT

(75) Inventor: Shintaroh Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 487 days.

(21) Appl. No.: 12/182,540

(22) Filed: Jul. 30, 2008

(65) Prior Publication Data
US 2009/0046322 A1   Feb. 19, 2009

(30) Foreign Application Priority Data

Aug. 13, 2007 (JP) ................ 2007-210779
Feb. 22, 2008 (JP) ................ 2008-041898

(51) Int. Cl.
*G06K 15/00* (2006.01)

(52) U.S. Cl. ........ 358/1.18; 358/1.12; 358/1.15; 358/1.16; 358/3.28; 715/225; 715/232; 715/243; 715/788

(58) Field of Classification Search .......... 358/1.18, 358/1.12, 1.15, 1.16, 3.28; 715/225, 232, 715/243, 788
See application file for complete search history.

(56) References Cited

U.S. PATENT DOCUMENTS

| | | | | |
|---|---|---|---|---|
| 7,633,640 | B2 * | 12/2009 | Miura et al. | 358/1.15 |
| 2002/0015169 | A1 * | 2/2002 | Vidyanand | 358/1.12 |
| 2005/0151999 | A1 * | 7/2005 | Inikori | 358/1.18 |
| 2005/0219665 | A1 * | 10/2005 | Mino | 358/1.18 |
| 2006/0193020 | A1 * | 8/2006 | Vidyanand | 358/540 |
| 2007/0002356 | A1 * | 1/2007 | Ha | 358/1.15 |
| 2007/0268522 | A1 * | 11/2007 | Miyamoto | 358/1.18 |
| 2007/0285724 | A1 * | 12/2007 | Saito | 358/1.18 |
| 2008/0049258 | A1 * | 2/2008 | Moyo et al. | 358/3.28 |

FOREIGN PATENT DOCUMENTS

| | | |
|---|---|---|
| JP | 7-64981 | 3/1995 |
| JP | 7-129689 | 5/1995 |
| JP | 8-142438 | 6/1996 |
| JP | 2887518 | 2/1999 |
| JP | 2003-131983 | 5/2003 |

OTHER PUBLICATIONS

Japanese Office Action issued Dec. 6, 2011, in Patent Application No. 2008-041898.
Tsutomu Hoshino, "Imasugu donyu! PHP + My SQL de tsukuru saisoku web system (Introduce now! The fastest web system on PHP + My SQL)", Gijutsu-Hyohron Co., Ltd., 1st Edition, Sep. 5, 2003, pp. 149-150 (with English translation).

(Continued)

*Primary Examiner* — Benny Q Tieu
*Assistant Examiner* — Juan Guillermety
(74) *Attorney, Agent, or Firm* — Oblon, Spivak, McClelland, Maier & Neustadt, L.L.P.

(57) ABSTRACT

A data storing unit stores therein first data that includes replaceable data and can be printed by a printing unit or generate print data to be printed. A map-information storing unit stores therein data identification information for identifying the replaceable data and its position in the first data in association with each other. A replacement-data obtaining unit obtains the data identification information and replacement data for replacing the replaceable data. A data generating unit generates second data in which the replaceable data is replaced with the replacement data at the position corresponding to the data identification information.

12 Claims, 7 Drawing Sheets

OTHER PUBLICATIONS

Toshiya Kinnjou, Excel 2007 perfect master [full support for Windows Vista and support for Windows XP], Shuwa System Co., Ltd., 1st Edition, Aug. 7, 2007, p. 835 (with English translation).

Keiichi Shima, "UNIX Advice (22)", UNIX Magazine, vol. 11, No. 11, Nov. 1996, pp. 115-118 (with English translation).

* cited by examiner

|   | A | B | C | D | E |
|---|---|---|---|---|---|
| 1 | 22 | 23 | TEST FORM | 24 | 25 |
| 2 |   |   |   |   |   |
| 3 | CLIENT | AAAAAAA |   | CONTRACTOR | BBBBBBBBBB |
| 3 |   |   |   |   |   |
| 5 | NO. | PRODUCT CODE | QUANTITY | AMOUNT |   |
| 6 | 01 | A000000001 | B0000001 | C00000001 |   |
| 7 | 02 | A000000002 | B0000002 | C00000002 |   |
| 8 | 03 | A000000003 | B0000003 | C00000003 |   |
| 9 | 04 | A000000004 | B0000004 | C00000004 |   |

FIG. 3

```
#ID, X COORDINATE, Y COORDINATE, KEYWORD, LENGTH
1, 057C, 01DF, TEST FORM, 7
2, 0174, 02FA, CLIENT, 3
3, 0323, 02FA, AAAAAAA, 7
              ⋮
```

FIG. 4

ID, OFFSET FROM TOP OF PRINT DATA, LENGTH, RIGHT ALIGNED (R) OR LEFT ALIGNED (L)
1, 775, 7
2, 7B7, 3
3, 7CF, 7

FIG. 5

ID, OFFSET FROM TOP OF PRINT DATA, LENGTH, RIGHT ALIGNED (R) OR LEFT ALIGNED (L)
3, 7CF, 7, L

```
                    31
                   ↙
731 861 moveto
 ┌─────────────────────────────┐
 │<39ED39ED39ED39ED39ED39ED39ED>│[92 92 92 92 92 92  0]xshow
 └─────────────────────────────┘
                 ↙
                32
```

FIG. 10

```
731 861 moveto
 ┌─────────────────────────────┐
 │<085D0826086F082C086F0844086F>│[92 92 92 92 92 92  0]xshow
 └─────────────────────────────┘
              ↙
             41
```

FIG. 11

TEST FORM

| CLIENT | RICOHSP |
|---|---|

| CONTRACTOR | BBBBBBBBBB |
|---|---|

| NO. | PRODUCT CODE | QUANTITY | AMOUNT |
|---|---|---|---|
| 01 | A000000001 | B0000001 | C00000001 |
| 02 | A000000002 | B0000002 | C00000002 |
| 03 | A000000003 | B0000003 | C00000003 |
| 04 | A000000004 | B0000004 | C00000004 |

INFORMATION PROCESSING APPARATUS, IMAGE FORMING APPARATUS, PRINT-DATA GENERATION METHOD, MAP-INFORMATION GENERATION METHOD, AND COMPUTER PROGRAM PRODUCT

CROSS-REFERENCE TO RELATED APPLICATIONS

The present application claims priority to and incorporates by reference the entire contents of Japanese priority document 2007-210779 filed in Japan on Aug. 13, 2007 and Japanese priority document 2008-041898 filed in Japan on Feb. 22, 2008.

BACKGROUND OF THE INVENTION

1. Field of the Invention

The present invention relates to an information processing apparatus, an image forming apparatus, a print-data generation method, a map-information generation method, and a computer program product.

2. Description of the Related Art

Recently, an Application Service Provider (ASP) that provides various services is frequently used with an application program installed in a server device connected to the Internet. Data of a processing result by the ASP is transmitted from the server device that has performed processing to a client terminal, which has requested the processing, and after the client terminal displays and confirms the data, the client terminal transmits the data to a printer to print the data. Therefore, this process causes a problem of heavy network load.

To solve this problem, a printing system that prints data according to a printing instruction from the client terminal has been disclosed (see Japanese Patent Application Laid-open No. 2003-131983). In such a printing system, after an application instructed from the client terminal is executed, print data generated by the server device is transmitted to the printer and printed according to a printing instruction. Therefore, data transmission to the client terminal and data transmission from the client terminal to the printer are not required, to thereby reduce the network load.

In the technique disclosed in Japanese Patent Application Laid-open No. 2003-131983, however, every time the application is executed by the server device, the whole print data is transmitted even if there is only a minor change in the data. Therefore, there is still a room for further reduction of the network load.

Further, even in a case of using a format that is stylized like an order form, and print data is completed by changing a part of data, print data is generated every time printing is instructed, and the print data itself is exchanged on the network. Therefore, there is still heavy load on the network, the server device, and the printer.

SUMMARY OF THE INVENTION

It is an object of the present invention to at least partially solve the problems in the conventional technology.

According to an aspect of the present invention, there is provided an information processing apparatus including a data storing unit that stores therein first data that can be printed by a printing unit or can generate print data to be printed by the printing unit, the first data including replaceable data; a map-information storing unit that stores therein data identification information for identifying the replaceable data and a position of the replaceable data in the first data in association with each other; a replacement-data obtaining unit that obtains the data identification information and replacement data for replacing the replaceable data; and a data generating unit that generates second data in which the replaceable data is replaced with the replacement data at the position corresponding to the data identification information stored in the map-information storing unit.

Furthermore, according to another aspect of the present invention, there is provided a method of generating print-data, including obtaining data identification information for identifying replaceable data included in first data, which can be printed by a printing unit or can generate print data to be printed by the printing unit and replacement data for replacing the replaceable data; and generating second data in which the replaceable data is replaced with the replacement data at a position corresponding to data identification information.

Moreover, according to still another aspect of the present invention, there is provided a method of generating map information, including first data that can be printed by a printing unit or can generate print data to be printed by the printing unit, the first data including replaceable data; and generating map information in which data identification information for identifying the replaceable data and a position of the replaceable data in the first data are associated with each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The present invention is not limited to the embodiments.

A first embodiment of the present invention is explained with reference to the accompanying drawings. In the first embodiment, a so-called multi function peripheral (MFP) including a copy function, a facsimile (FAX) function, a print function, a scanner function, and a function for distributing input image data (image data read by the scanner function, image data formed by the print function, and image data received by the FAX function) is used as one example of an image forming apparatus constituting the printing system is explained.

Figure 1:
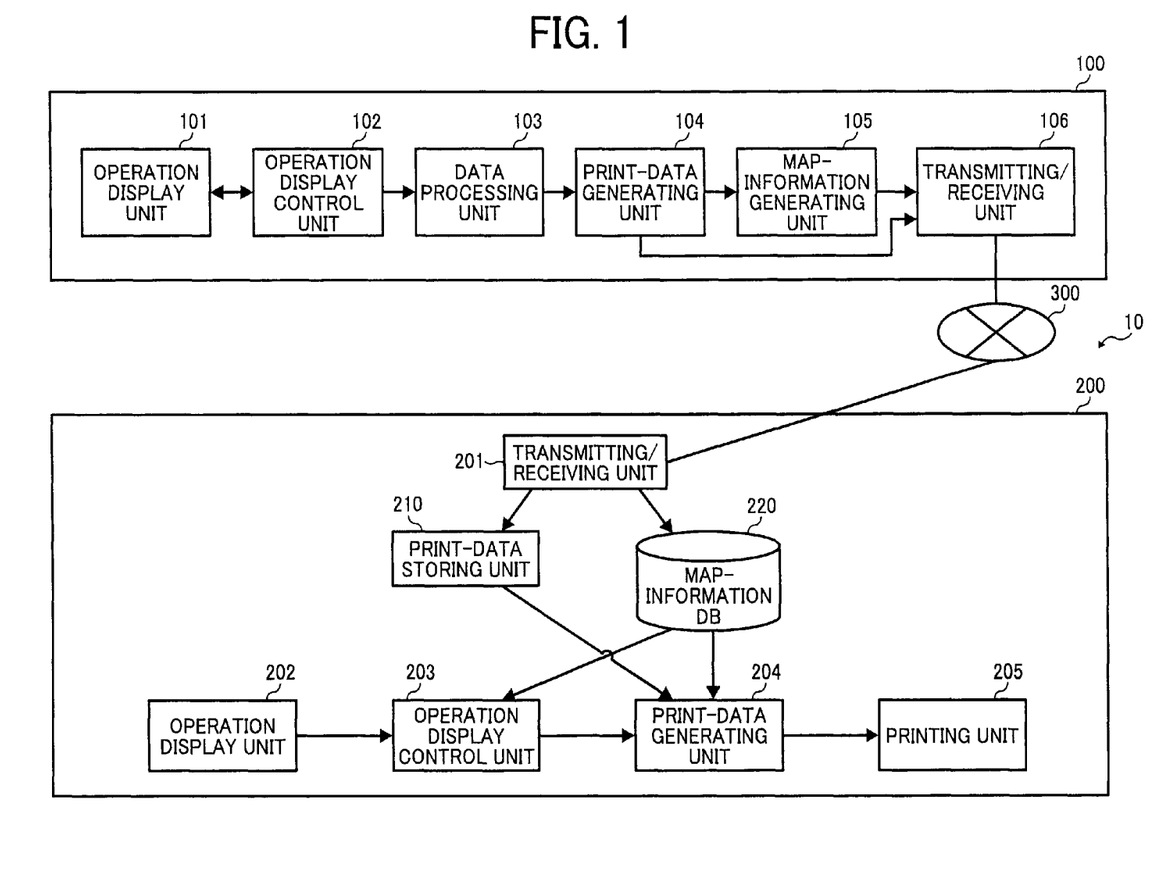
FIG. 1 is a block diagram of a configuration of a printing system according to a first embodiment of the present invention.

First, a configuration example of the printing system, to which the present invention is applied, is explained. FIG. 1 is a block diagram of the printing system according to the first embodiment. A printing system 10 according to the first embodiment includes a server device 100 and an MFP 200, and the server device 100 and the MFP 200 are connected to each other via a network 300 such as the Internet and a telephone line. The network 300 can be realized as a wired or wireless local area network (LAN) and as an in-plant printing system.

The server device 100 includes an operation display unit 101, an operation display control unit 102, a data processing unit 103, a print-data generating unit 104, a map-information generating unit 105, and a transmitting/receiving unit 106. While the server device 100 is explained in the first embodiment, it can be replaced by a personal computer or the like.

Figure 2:
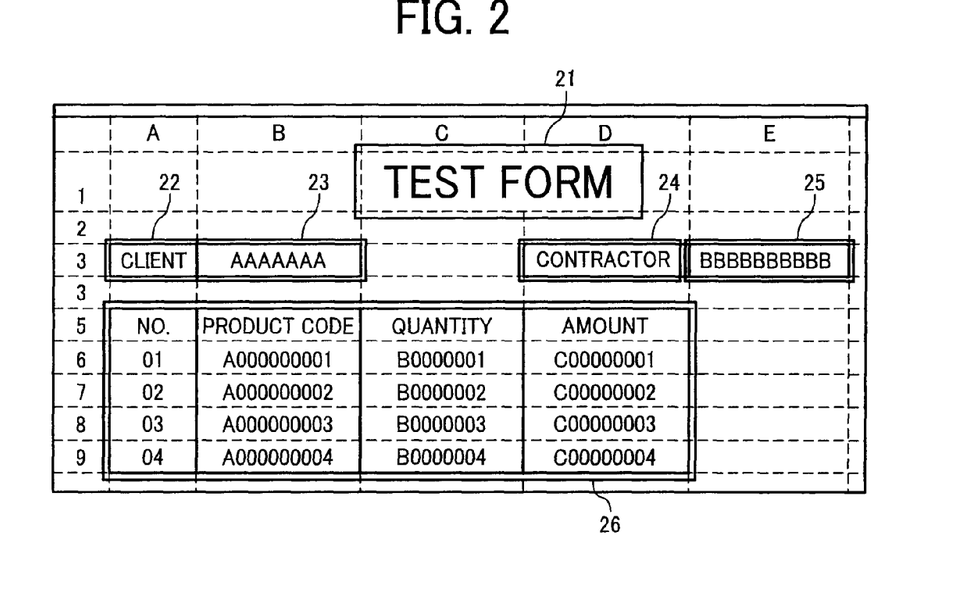
FIG. 2 is a schematic diagram for explaining one example of a display screen for inputting a slip to be printed.

The operation display unit 101 is an input/output unit such as a display, a keyboard, and a mouse, and data is input from the keyboard and the mouse and displayed on the display. FIG. 2 is one example of a display screen for inputting a slip to be printed. FIG. 2 is also an example when an order slip is input by using Microsoft Excel®. Text data shown in frames 21 to 25 are replaceable data. For example, frame 23 is client's name, and "AAAAAAA" is input as dummy text data. Frame 25 is contractor's name, and "BBBBBBBBBB" is input as dummy text data. Text data shown in frame 26 are replaceable respectively, that is, for each of No., Product, Quantity, Amount, 01, A000000001, . . . , and dummy text data is input therein. The printing form as shown here is not pre-defined, and can be freely input by a user using the operation display unit 101.

The operation display control unit 102 receives data input by the operation display unit 101, to control display of data on the display, and also receives a processing instruction with respect to the data from the operation display unit 101.

The data processing unit 103 processes the data according to the data received by the operation display control unit 102 and the processing instruction. The data processing unit 103 can be, for example, existing software such as Microsoft Excel®, or individually developed software.

The print-data generating unit 104 generates print data from a result of processing executed by the data processing unit 103. Specifically, the print-data generating unit 104 is a printer driver. The print data here is data in a format directly printable by the MFP 200 or data capable of generating print data to be printed by the MFP 200. The print-data generating unit 104 generates print data in a format corresponding to the MFP 200, which is a transmission destination via the network 300. Therefore, when the MFP 200 at the destination corresponds to a PostScript format, the print-data generating unit 104 generates print data in the PostScript format, and when the printer corresponds to a unique format, generates the print data in the unique format. The data capable of generating print data to be printed by the MFP 200 is data in which a part of the print data to be printed by the MFP 200 is changed or deleted, or data capable of generating print data according to easy processing with a printing unit 205 in the MFP 200.

The map-information generating unit 105 generates map information of text data included in the print data generated by the print-data generating unit 104. The map information here includes map information (character string) referred to by the user at the time of inputting the replacement data, and map information (character position) indicating a position of the text data in the print data.

Figure 3:
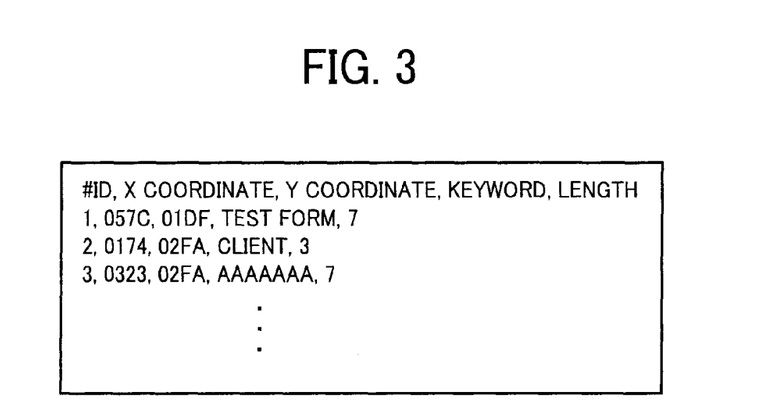
FIG. 3 is a schematic diagram for explaining one example of a data structure of map information (character string)

FIG. 3 is one example of a data structure of the map information (character string). As shown in FIG. 3, the map information (character string) includes information of text data ID for identifying text data included in the print data, X coordinate at a start point of the text data in the print data, Y coordinate at the start point of the text data in the print data, keyword, which is text data, and length indicating number of characters of the text data. For example, ID "1", X coordinate "057C", Y coordinate "01DF", keyword "test form", and length "7" are stored with respect to "test form", which is a title of the slip shown in FIG. 2.

Figure 4:
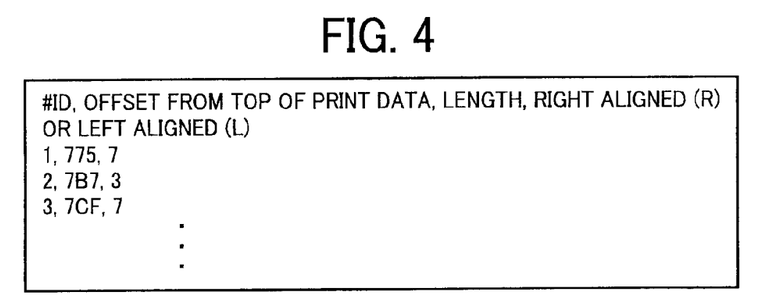
FIG. 4 is a schematic diagram for explaining one example of a data structure of map information (character position)

FIG. 4 is one example of a data structure of the map information (character position). As shown in FIG. 4, the map information (character position) includes information of text data ID for identifying text data included in the print data, offset from the top of the print data, length indicating number of characters of the text data, and alignment direction. For example, ID "1", offset from the top of the print data "775", length "7" are stored with respect to the "test form". Offset from the top of the print data indicates the number of bytes from the top of the print data to the text data.

Figure 5:
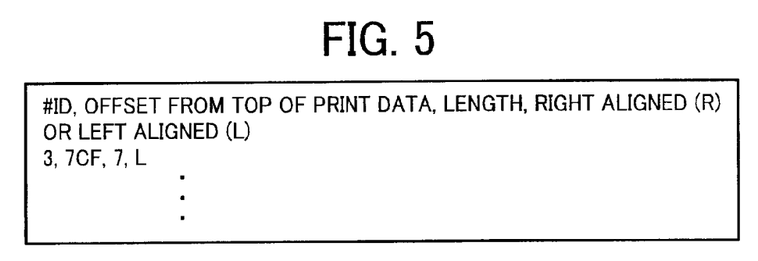
FIG. 5 is a schematic diagram for explaining one example of edited map information (character position)

The map-information generating unit 105 generates map information for all text data included in the print data, like the map information (character position) shown in FIG. 4. Text data, which is not replaced, can be specified by editing the map information at this point in time. FIG. 5 is one example of the edited map information (character position). As shown in FIG. 5, the text data is not replaced by deleting the map information corresponding to the text data not to be replaced. That is, because ID=1, 2 are deleted, text data of "test format" and "client" is not replaced. Further, right aligned (R) and left aligned (L) can be specified in the map information. In ID=3, left aligned (L) is specified.

The transmitting/receiving unit 106 transmits the print data generated by the print-data generating unit 104 and the map information generated by the map-information generating unit 105 to the MFP 200.

The MFP 200 is explained next. The MFP 200 includes a transmitting/receiving unit 201, an operation display unit 202, an operation display control unit 203, a print-data generating unit 204, the printing unit 205, a print-data storing unit 210, and a map-information database (DB) 220. In the first embodiment, the MFP 200 is explained as one example; however, a printer, a mobile phone, or a personal digital assistant (PDA) can be used instead of the MFP 200. When the print data is printed by using the mobile phone or PDA, the print data needs to be transmitted to a device having the print function via the network or a USB cable and output.

The transmitting/receiving unit 201 receives the print data and the map information transmitted from the server device 100. Further, the transmitting/receiving unit 201 stores the received print data in the print-data storing unit 210, and stores the received map information in the map-information DB 220.

The operation display unit 202 is an input/output unit such as an operation panel and an operation button, and data is input from the operation panel or the like and displayed on the operation panel or the like. The data identification information and the replacement data for replacing the data included in the print data stored in the print-data storing unit 210 are input to the operation display unit 202.

The operation display control unit 203 receives data input from the operation display unit 202 and controls display of data on the operation display unit 202.

The print-data storing unit 210 stores print data including replaceable data transmitted from the server device 100. In the first embodiment, one print data is stored in the print-data storing unit 210; however, plural pieces of print data can be stored in association with print data ID for identifying the print data.

The map-information DB 220 stores map information of the replaceable data included in the print data. The replaceable data here is data that can be replaced in the print data, and is stored in the map information as a replacement object. In the first embodiment, the replaceable data is explained as text data; however, it is not limited to the text data, and for example, can be a figure or image, so long as replacement in the print data is possible.

Further, the map information stored in the map-information DB 220 includes the map information (character string) and the map information (character position). As shown in FIG. 3, the map information (character string) stores the text data ID for identifying text data, character position (X coordinate, Y coordinate), keyword, which is text data, and length indicating number of characters, in association with each other. The map information (character position) stores, as shown in FIG. 4, the text data ID for identifying text data, character position (offset from the top of the print data), length as the number of characters, and information indicating right aligned or left aligned, in association with each other.

The print-data generating unit 204 obtains the print data from the print-data storing unit 210, and the map information from the map-information DB 220. The print-data generating unit 204 generates the print data according to the map information, the text data ID input by the operation display unit 202, and the replacement data for replacing the text data in the print data.

The printing unit 205 outputs the print data generated by the print-data generating unit 204 onto a paper medium or the like.

Figure 6:
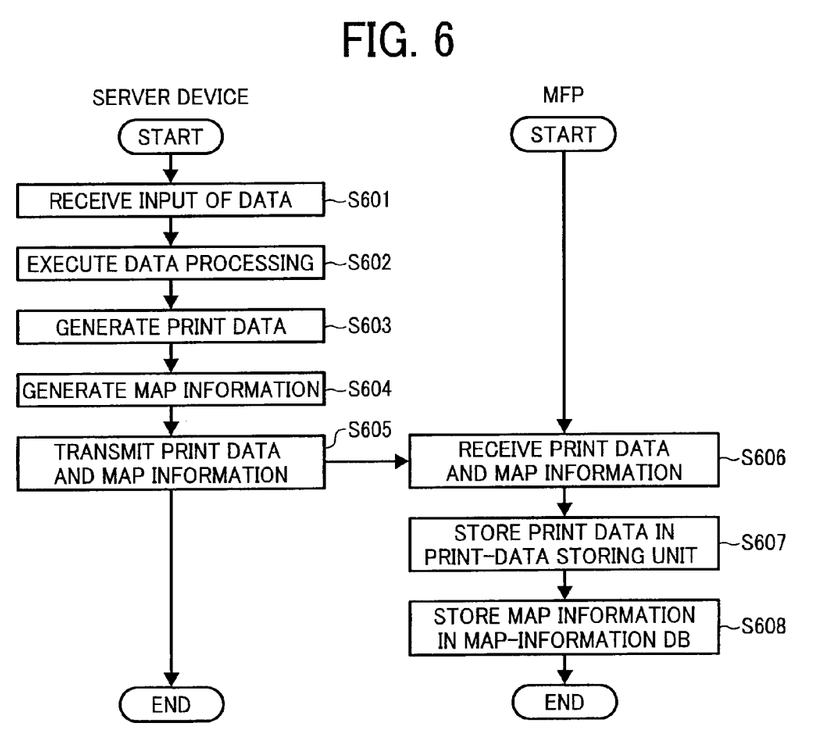
FIG. 6 is a flowchart of a print-data/map-information generating process procedure performed by a server device and an MFP.

A print-data/map-information generating process by the printing system 10 having the above configuration is explained next. FIG. 6 is a flowchart of a print-data/map-information generating process procedure performed by the server device and the MFP. The process shown in the flowchart in FIG. 6 is preprocessing for printing the print data by the MFP 200.

The operation display control unit 102 first receives the data input by the operation display unit 101 (Step S601). For example, the operation display control unit 102 activates Microsoft Excel®, and receives the data input from the display screen as shown in FIG. 2. The operation display control unit 102 receives an input of data required for the slip, such as ruled line as well as the text data. The dummy text data includes the number of characters same as the maximum size of data, and the type of characters such as half size or full size is matched with the data to be replaced at the time of printing. For example, if the client's name is in full size, and seven characters maximum, full-size seven characters such as "AAAAAAA" are input.

The data processing unit 103 then executes the instructed processing with respect to the received data (Step S602). For example, when the processing for generating a slip from the data input by the operation display unit 101 is instructed, the data processing unit 103 executes the processing for generating the slip. The print-data generating unit 104 generates print data from a processing result obtained by the data processing unit 103 (Step S603). Specifically, the print-data generating unit 104, which is a printer driver, generates the print data from the slip processed by the data processing unit 103.

The map-information generating unit 105 generates map information from the print data generated by the print-data generating unit 104 (Step S604). Specifically, the map-information generation program extracts text data and position information thereof from the print data, to generate the map information as shown in FIGS. 3 and 4. According to the map-information generation program, when the print data is, for example, in PostScript format, the text data in the print data is extracted based on the PostScript specification to generate the map information. Specifically, blocks of text portions before "show", "xshow", "yshow", and "xyshow" are extracted. The map-information generating unit 105 transmits the print data and the map information to the MFP 200 (Step S605).

In the MFP 200, the transmitting/receiving unit 201 receives the print data and the map information (Step S606). The transmitting/receiving unit 201 stores the received print data in the print-data storing unit 210 (Step S607). Further, the transmitting/receiving unit 201 stores the received map information in the map-information DB 220 (Step S608).

Because the print data including the text data, which may be replaced, and the map information indicating the position of the text data are generated beforehand on the server device 100 side, and the print data and the map information are transmitted to the MFP 200, the print data is not generated every time the server device 100 inputs the slip, and the print data is not transmitted from the server device 100 to the MFP 200. Accordingly, the load on the server device 100 and the network 300 can be reduced.

Figure 7:
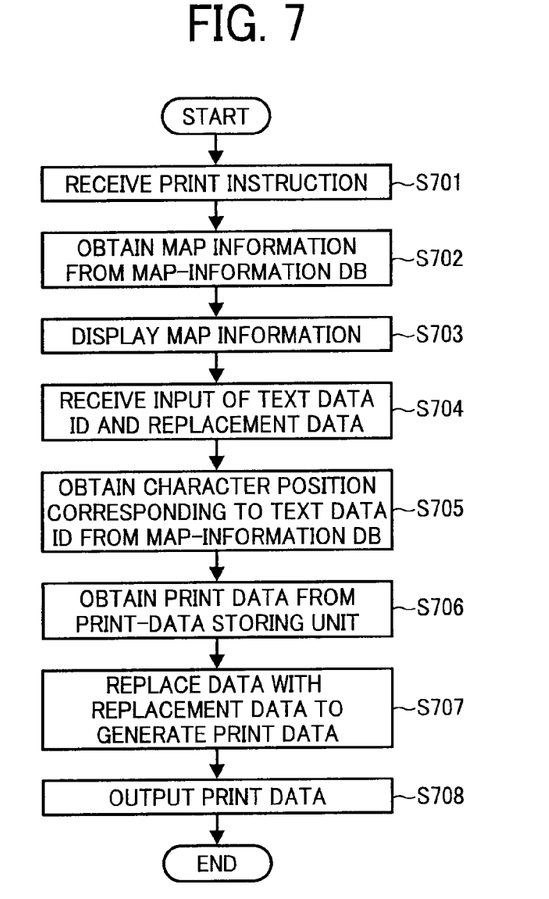
FIG. 7 is a flowchart of a print-data generation and output process performed by an MFP.

A print-data generation and output process by the MFP 200 is explained next. FIG. 7 is a flowchart of the print-data generation and output process performed by the MFP 200.

The operation display control unit 203 first receives a print instruction input from the operation display unit 202 (Step S701). The operation display control unit 203 then obtains the map information from the map-information DB 220 (Step S702). The operation display control unit 203 controls so that the obtained map information is displayed on the operation display unit 202 (Step S703). Specifically, the map information shown in FIGS. 3 and 4 is displayed on the operation display unit 202.

Figure 8:
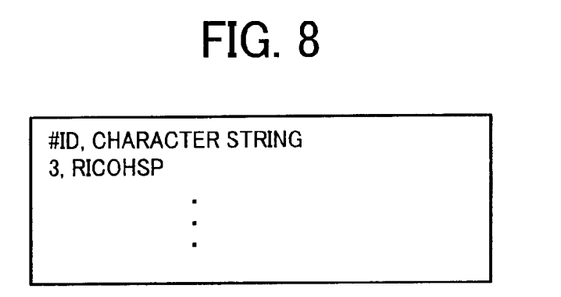
FIG. 8 is a schematic diagram for explaining one example of an input text data ID and replacement data.

The operation display control unit 203 refers to or edits the displayed map information to receive text data ID and replacement data (Step S704). FIG. 8 is one example of the input text data ID and replacement data. When it is desired to replace the client's name "AAAAAAA" of the print data before replacement with "RICOHSP", using the map information (character string) as shown in FIG. 3 as a key for specifying the text data as the replacement object on the slip, as shown in FIG. 8, replacement of the character string can be specified by inputting the text data ID and "3, RICOHSP" as the replacement data.

The print-data generating unit 204 obtains a character position corresponding to the text data ID from the map-information DB 220 (Step S705). The print-data generating unit 204 obtains the print data before replacement from the print-data storing unit 210 (Step S706). The print-data generating unit 204 then generates the print data after replacement based on the character position, replacement data (character string), and the print data before replacement (Step S707).

Figure 9:
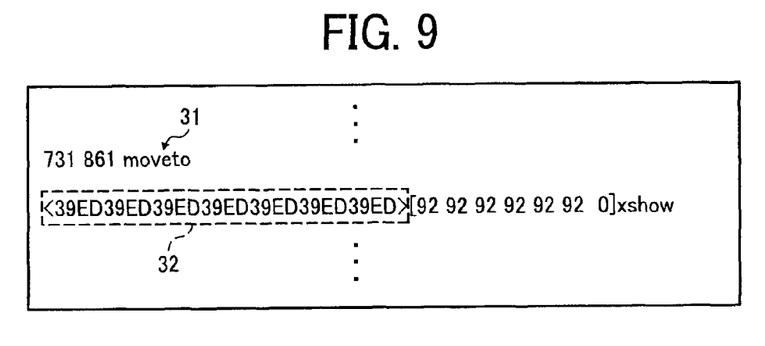
FIG. 9 is a schematic diagram for explaining a part of print data before replacement.

A print-data generation process of print data in the PostScript format is specifically explained as one example. FIG. 9 is a schematic diagram for explaining a part of the print data before replacement. "731 861 moveto" denoted by 31 in FIG. 9 indicates that drawing starts from a position of X coordinate=731 and Y coordinate=861. Further, in "<39ED39ED39ED39ED39ED39ED39ED>[92 92 92 92 92 92 0]×show denoted by 32 in FIG. 9, "39ED" expresses "A", and this indicates that A is drawn seven times. "92" indicates that drawing is performed by shifting the coordinate by 92 units for one character.

Figure 10:
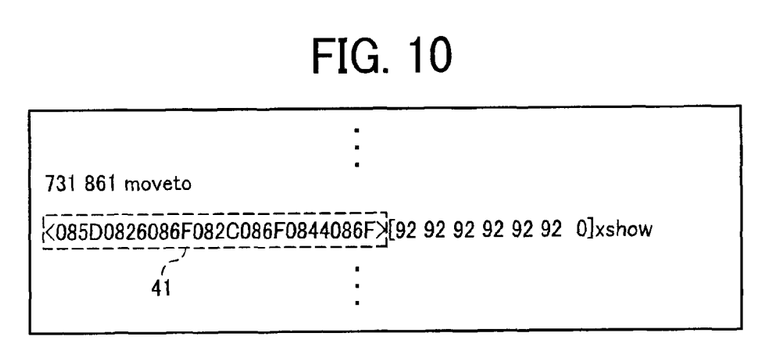
FIG. 10 is a schematic diagram for explaining a part of the print data after replacement.

"AAAAAAA" is replaced with "RICOHSP" by using the character position and the replacement data (character string). FIG. 10 is a schematic diagram for explaining a part of the print data after replacement. By replacing "<39ED39ED39ED39ED39ED39ED39ED>" indicating a part of the print data in FIG. 9 with "<085D0826086F082C086F0844086F>", print data in which "AAAAAA" is replaced with "RICOHSP" is generated.

Figure 11:
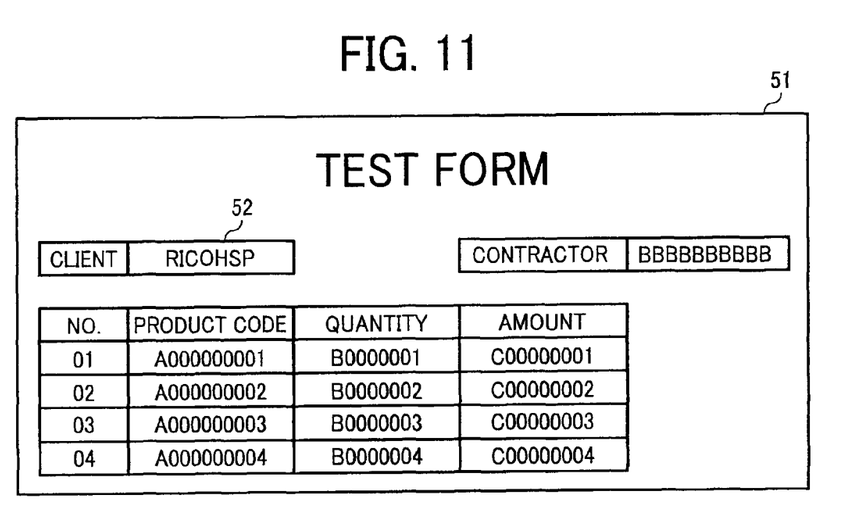
FIG. 11 is a schematic diagram for explaining one example of a slip on which print data in which text data is replaced with replacement data is printed.

The printing unit 205 outputs the print data in which the text data is replaced with the replacement data (Step S708). FIG. 11 is a schematic diagram for explaining one example of the slip on which the print data in which text data is replaced with the replacement data is printed. In a slip 51 printed as shown in FIG. 11, the text data written in the column of client's name "AAAAAAA" in the print data before replacement generated by the server device 100 is replaced with "RICOHSP" and printed. In the above example, all of 7 digits are replaced; however, when there is a left over space, a blank is supplemented at the head or at the tail according to right aligned (R) or left aligned (L). For example, when the text data is replaced with "ARCSP" in left aligned (L) column, two blanks are supplemented at the end and replaced with "ARCSP".

In this manner, the MFP 200 receives the print data in a printable format from the server device 100, receives an input of the replacement text data for replacing the text data included in the print data, to replace the text data in the print data with the replacement text data, thereby enabling to output printed matter required by the user only by the processing on the MFP 200 side. Accordingly, the load on the server device 100 and the network 300 can be reduced. Further, because the print-data generation process need not be performed by a printer driver of the MFP 200 at the time of outputting the printed matter, the processing load on the MFP 200 can be reduced.

Further, because the processing load on the device that generates the print data, which is desired to be output finally, is reduced, the print data can be generated and the printed matter can be output, by using the device having poor resources such as a central processing unit (CPU) and a memory, for example, by using a low-performance printer, the mobile phone, or the PDA. The mobile phone and the PDA can output the printed matter by transmitting the print data to the device having the print function.

Figure 12:
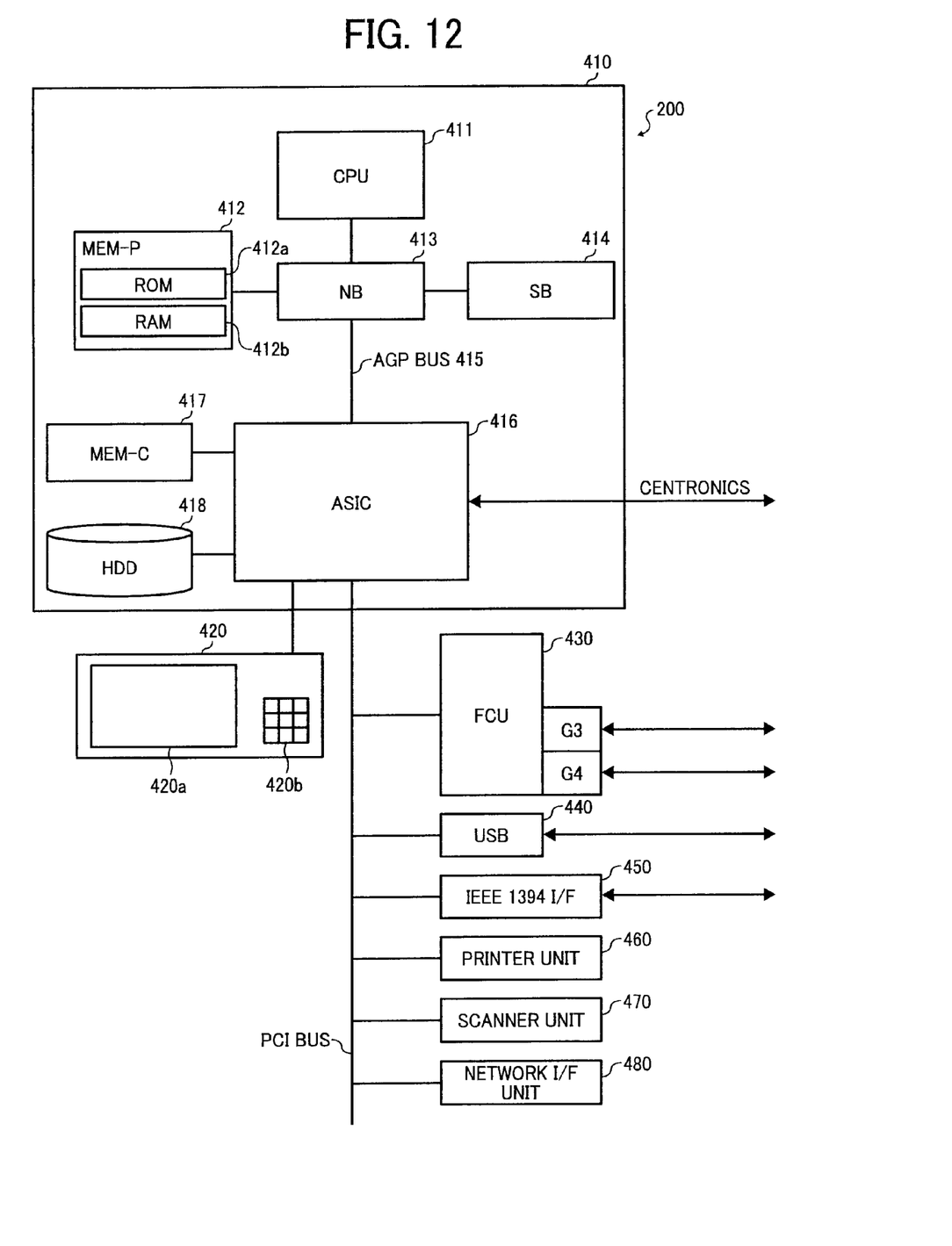
FIG. 12 is a schematic diagram for explaining a hardware configuration of an MFP according to the first embodiment.

A hardware configuration of the MFP 200 is explained next. FIG. 12 is a schematic diagram for explaining the hardware configuration of the MFP according to the first embodiment. As shown in FIG. 12, the MFP 200 has a configuration in which a control unit 410, a printer unit 460, and a scanner unit 470 are connected with each other via a peripheral component interconnect (PCI) bus. The control unit 410 controls the entire digital MFP 200, drawing, communication, and an input from an operating unit 420. The printer unit 460 and the scanner unit 470 include an image processing portion that performs error diffusion for performing binarization, gamma transformation for performing tone reproduction, and the like. The operating unit 420 includes an operation display unit 420*a* that displays original image information of an original read by the scanner unit 470 on a liquid crystal display (LCD) and receives an input from an operator via a touch panel, and a keyboard 420*b* that receives a key input from the operator.

The digital MFP 200 according to the first embodiment can change over and select a document box function, the copy function, a printer function, the scanner function, and the FAX function, by an application change-over key of the operating unit 420. At the time of selecting the document box function, mode is set to a document box mode, at the time of selecting the copy function, the mode is set to a copy mode, at the time of selecting the printer function, the mode is set to a printer mode, at the time of selecting the scanner function, the mode is set to a scanner mode, and at the time of selecting the FAX function, the mode is set to a FAX mode.

The control unit 410 has a CPU 411, which is a main unit of the computer, a system memory (MEM-P) 412, a north bridge (NB) 413, a south bridge (SB) 414, an application specific integrated circuit (ASIC) 416, a local memory (MEM-C) 417 as a storing unit, and a hard disk drive (HDD) 418 as a storing unit. The NB 413 and the ASIC 416 are connected with each other via an accelerated graphics port (AGP) bus 415. The MEM-P 412 further includes a read only memory (ROM) 412*a* and a random access memory (RAM) 412*b*.

The CPU 411 performs overall control of the digital MFP 200, has a chip set including the NB 413, the MEM-P 412, and the SB 414, and connected to other devices via the chip set.

The NB 413 is a bridge for connecting the CPU 411 with the MEM-P 412, the SB 414, and the AGP bus 415, and includes a memory control unit that controls read and write with respect to the MEM-P 412, a PCI master, and an AGP target.

The MEM-P 412 is a system memory used as a storage memory for programs and data, an expansion memory for programs and data, and a drawing memory for the printer, and includes the ROM 412*a* and the RAM 412*b*. The ROM 412*a* is a read only memory used as the storage memory for programs and data for controlling the operation of the CPU 411, and the RAM 412*b* is a writable and readable memory used as the expansion memory for programs and data and the drawing memory for the printer.

The SB 414 is a bridge for connecting the NB 413 to a PCI device and a peripheral device. The SB 414 is connected to the NB 413 via the PCI bus, and a network I/F unit 480 is also connected to the PCI bus.

The ASIC 416 is an integrated circuit (IC) for image processing application, having a hardware element for image processing, and has a role of a bridge for respectively connecting the AGP bus 415, the PCI bus, the HDD 418, and the MEM-C 417. The ASIC 416 includes a PCI target, an AGP master, an arbiter (ARB), which is a core of the ASIC 416, a memory control unit that controls the MEM-C 417, a plurality of direct memory access control units (DMAC) that performs rotation of the image data and the like by a hardware logic or the like, and a PCI unit that performs data transfer with the printer unit 460 and the scanner unit 470 via the PCI bus. To the ASIC 416 are connected a Fax control unit (FCU) 430, a universal serial bus (USB) 440, the IEEE 1394 I/F 450.

The MEM-C 417 is a local memory used as a copy image buffer and a code buffer. The HDD 418 is a storage that stores image data, a program that controls the operation of the CPU 411, font data, and forms.

The AGP bus 415 is a bus interface for a graphics accelerator card proposed for speeding up the graphics accelerator card, and the MEM-P 412 is directly accessed with a high throughput, to increase the speed of the graphics accelerator card.

The program executed by the MFP 200 according to the first embodiment is incorporated in the ROM or the like beforehand and provided. The program executed by the MFP 200 according to the first embodiment can be also recorded on a computer readable recording medium such as a CD-ROM, a flexible disk (FD), a CD-R, or a digital versatile disk (DVD) in an installable format file or executable format file and provided.

Further, the program executed by the MFP 200 according to the first embodiment can be stored on a computer connected to the network such as the Internet and provided by being downloaded via the network. Furthermore, the program executed by the MFP 200 according to the first embodiment can be provided or distributed via the network such as the Internet.

The program executed by the MFP 200 according to the first embodiment has a module configuration including the respective units (the transmitting/receiving unit, the operation display control unit, the print-data generating unit, the printing unit, and the like). As the actual hardware, the CPU (processing unit) reads the program from the ROM and executes the program, to load the respective units on the main memory, so that the transmitting/receiving unit, the operation display control unit, the print-data generating unit, the printing unit, and the like are generated on the main memory.

The server device 100 according to the first embodiment includes a control unit such as the CPU, a memory such as the ROM and RAM, an external memory such as the HDD and a CD drive, a display unit such as the display, an input unit such as a keyboard and a mouse, a communication interface for connecting to an external network, and a bus for connecting these respective units, and has a hardware configuration using a normal computer.

The program executed by the server device 100 is incorporated in the ROM or the like beforehand and provided. The program executed by the server device 100 according to the first embodiment can be recorded on the computer readable recording medium such as a CD-ROM, an FD, a CD-R, or a DVD in the installable format file or executable format file and provided.

Further, the program executed by the server device 100 according to the first embodiment can be stored on the computer connected to the network such as the Internet and provided by being downloaded via the network. Furthermore, the program executed by the server device 100 according to the first embodiment can be provided or distributed via the network such as the Internet.

The program executed by the server device 100 according to the first embodiment has a module configuration including the respective units (the operation display control unit, the data processing unit, the print-data generating unit, the map-information generating unit, the transmitting/receiving unit, and the like). As the actual hardware, the CPU (processing unit) reads the program from the ROM and executes the program, to load the respective units on the main memory, so that the operation display control unit, the data processing unit, the print-data generating unit, the map-information generating unit, the transmitting/receiving unit, and the like are generated on the main memory.

A second embodiment of the present invention is explained with reference to the accompanying drawings. A configuration example of the printing system, to which the present invention is applied, is explained only for parts different from the first embodiment. Other parts are the same as those in the first embodiment, and therefore the corresponding explanations are referred thereto and explanations thereof will be omitted.

Figure 13:
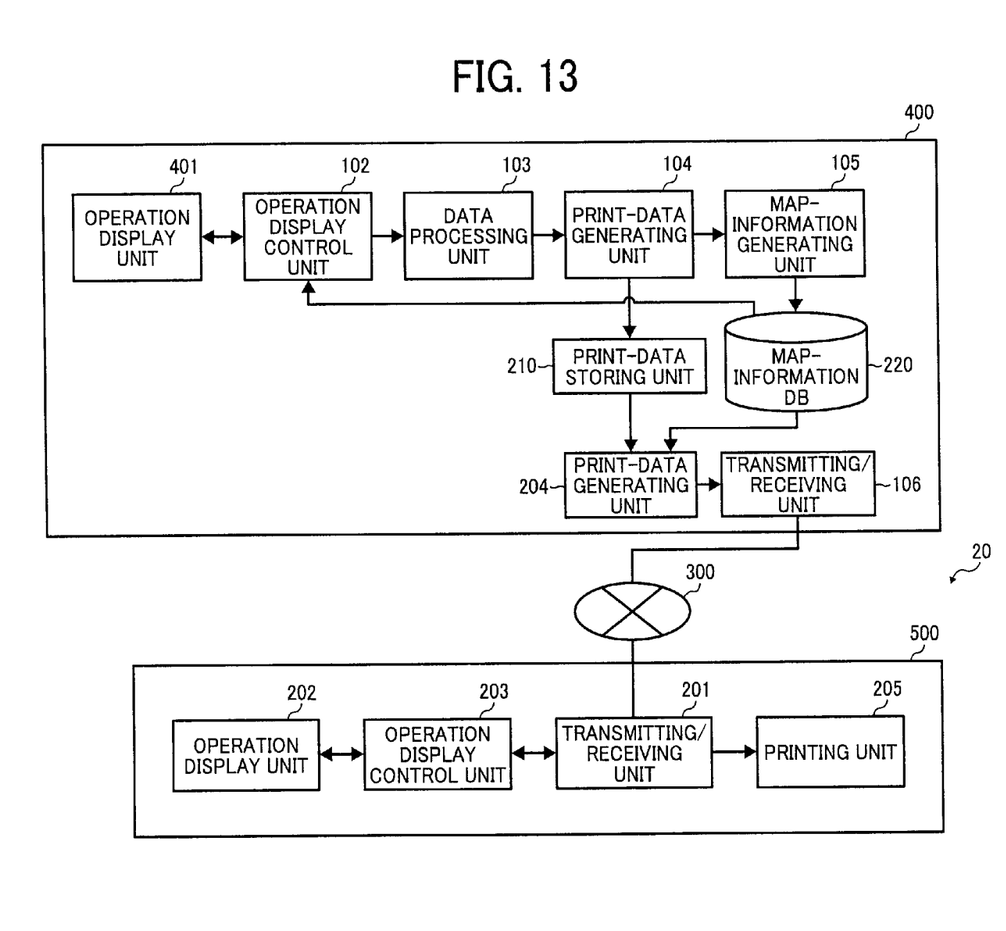
FIG. 13 is a block diagram of a printing system according to a second embodiment of the present invention.

FIG. 13 is a block diagram of the printing system according to the second embodiment. A printing system 20 according to the second embodiment includes a server device 400 and an MFP 500, and the server device 400 and the MFP 500 are connected to each other via the network 300 such as the Internet and a telephone line as in the first embodiment.

The server device 400 includes an operation display unit 401, the operation display control unit 102, the data processing unit 103, the print-data generating unit 104, the map-information generating unit 105, the transmitting/receiving unit 106, the print-data generating unit 204, the print-data storing unit 210, and the map-information DB 220. The configuration and the function of the operation display control unit 102, the data processing unit 103, the print-data generating unit 104, the map-information generating unit 105, the transmitting/receiving unit 106, the print-data generating unit 204, the print-data storing unit 210, and the map-information DB 220 are the same as those in the first embodiment, and therefore explanations thereof will be omitted.

The operation display unit 401 receives an input of the data identification information and the replacement data for replacing the data included in the print data stored in the print-data storing unit 210, in addition to the function and the configuration of the operation display unit 101 described above.

The MFP 500 is explained next. The MFP 500 includes the transmitting/receiving unit 201, the operation display unit 202, the operation display control unit 203, and the printing unit 205. The configuration and the function of the transmitting/receiving unit 201, the operation display unit 202, the operation display control unit 203, and the printing unit 205 are the same as those in the first embodiment, and therefore explanations thereof will be omitted.

The print-data/map-information generating process by the printing system 20 having the above configuration is explained next. In the printing system 20, the print-data/map-information generating process shown in FIG. 6 is executed by the server device 400. For the details of the print-data/map-information generating process, FIG. 6 and the explanations of FIG. 6 are referred to the process, and explanations thereof will be omitted.

The print-data generation and output process by the printing system 20 is explained next. In the printing system 20, the server device 400 performs the process from Steps S701 to S707 in the print-data generation and output process shown in FIG. 7, and the transmitting/receiving unit 106 transmits the print data to the MFP 500. In the MFP 500, the transmitting/receiving unit 201 receives the print data, and outputs the print data, which is the process at Step S708. For the details of the print-data generation and output process, FIG. 7 and explanations of FIG. 7 are referred to the process, and explanations thereof will be omitted.

In this manner, because high-load processing such as generation of the print data and generation of the print data in which the text data is replaced with replacement data is executed by the server device, workload of the MFP can be reduced, thereby improving the processing capacity as the entire printing system. Further, because each of the server devices can perform these processes, the load on the server device itself can be balanced.

Furthermore, the server device replaces only a part of the generated print data with the replacement data, to generate the new print data. Therefore, the whole print data need not be generated every time the data is corrected, thereby enabling to reduce the load on the server device that includes the printer driver and generates the print data. For example, the print-data generation process, which has been performed by several high-performance server devices in conventional techniques, can be realized by a relatively inexpensive server device by using the technique according to the second embodiment.

Further, the server device according to the second embodiment can generate the print data as well as the print data in which the text data is replaced with the replacement data. Accordingly, the printing system can be configured by using a popularized printer with a normal function and performance.

While the first and second embodiments have been explained above, various modifications and improvements can be added to the embodiments. In addition, the configurations and functions explained in the first and second embodiments can be freely combined with each other.

According to an aspect of the present invention, the print data corresponding to an input by the user or data capable of generating the print data can be generated by replacing a part of the pre-generated print data or the data capable of generating the print data. Accordingly, the load on the processing for generating the print data can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of generating print-data, comprising:
    generating, at a server device, first data containing replaceable dummy data that can generate printable data or data to be printed by a printing unit;
    generating, at the server device, map information that correlates data identification information identifying the replaceable dummy data included in the first data with position information of the replaceable dummy data;
    transmitting the first data and the map information to an information processing apparatus connected to the server device via a network;
    receiving the first data and the map information from the server device;
    obtaining, at the information processing apparatus, the data identification information and replacement data for replacing the replaceable dummy data;
    generating, at an image forming apparatus of the information processing apparatus, second data in which the replaceable dummy data is replaced
    receiving an input of the replacement data for replacing the replaceable dummy data included in the first data;
    storing, in the information processing apparatus, the map information;
    generating the second data with the replacement data, at a position of the replaceable dummy data defined by the map information corresponding to the data identification information; and
    transmitting the second data to the printing unit.

2. The method according to claim 1, wherein the position is represented by an offset from a header of the first data.

3. The method according to claim 1, wherein the printing unit prints the second data or generates print data from the second data to print the print data.

4. A computer program product comprising a computer-usable, non-transitory medium having computer-readable program codes embodied in the medium that when executed cause a computer to execute the method according to claim 1.

5. The computer program product according to claim 4, wherein the position is represented by an offset from a header of the first data.

6. The computer program product according to claim 4, wherein the printing unit prints the second data or generates print data from the second data to print the print data.

7. A method of generating map information, comprising:
    generating, at a server device, first data including replaceable dummy data that can generate printable data or data to be printed by a printing unit;
    storing, at an information processing apparatus connected to the server device via a network, the first data;
    generating, at the server device, map information that correlates data identification information for identifying the replaceable dummy data with position information of the replaceable dummy data;
    storing, at the information processing apparatus, the map information; and
    transmitting the first data and the map information to the information processing apparatus for a replacement of the replaceable dummy data by replacement data at the information processing apparatus; and
    receiving the first data and the map information from the server device, wherein an image forming apparatus of the information processing apparatus generates second data with the replacement data, at a position of the replaceable dummy data defined by the map information corresponding to the data identification information.

8. The method according to claim 7, wherein the position of the replaceable dummy data is represented by an offset from a header of the first data.

9. A computer program product comprising a computer-usable, non-transitory medium having computer-readable program codes embodied in the medium that when executed cause a computer to execute the method according to claim 7.

10. The computer program product according to claim 9, wherein the position of the replaceable dummy data is represented by an offset from a header of the first data.

11. A printing system, comprising:
    a server device, and
    an information processing apparatus connected to the server device via a network, wherein
    the server device includes
        a first data generating unit that generates first data containing replaceable dummy data that can generate printable data or data to be printed by a printing unit,
        a map-information generating unit that generates map information that correlates data-identifying information identifying the replaceable dummy data included in the first data generated by the first data generating unit with position information of the replaceable dummy data, and
        a first transmitting unit that transmits the first data and the map information to the information processing apparatus, and
    the information processing apparatus includes
        a first receiving unit that receives the first data and the map information from the first transmitting unit, an image forming apparatus that generates second data which is obtained by replacing the replaceable dummy data included in the first data received by the first receiving unit, and a printing unit that prints the second data generated by the image forming apparatus or generates print data from the second data and prints the print data, and the image forming apparatus includes a second receiving unit that receives an input of replacement data for replacing the replaceable dummy data included in the first data, a data storing unit that stores therein the first data received by the first receiving unit, a map-information storing unit that stores therein the map information received by the first receiving unit, a replacement-data obtaining unit that obtains the data-identifying information and the replacement data for replacing the replaceable dummy data, a second data generating unit that generates the second data with the replacement data, at a position of the replaceable dummy data defined by the map information corresponding to the data-identifying information, and a second transmitting unit that transmits the second data to the printing unit.

12. The printing system according to claim 11, wherein the position of the replaceable dummy data is represented by an offset from a header of the first data.

* * * * *